(No Model.)
DE WITT C. PRESCOTT.
RECIPROCATING SAW MILL.
No. 319,619. Patented June 9, 1885.
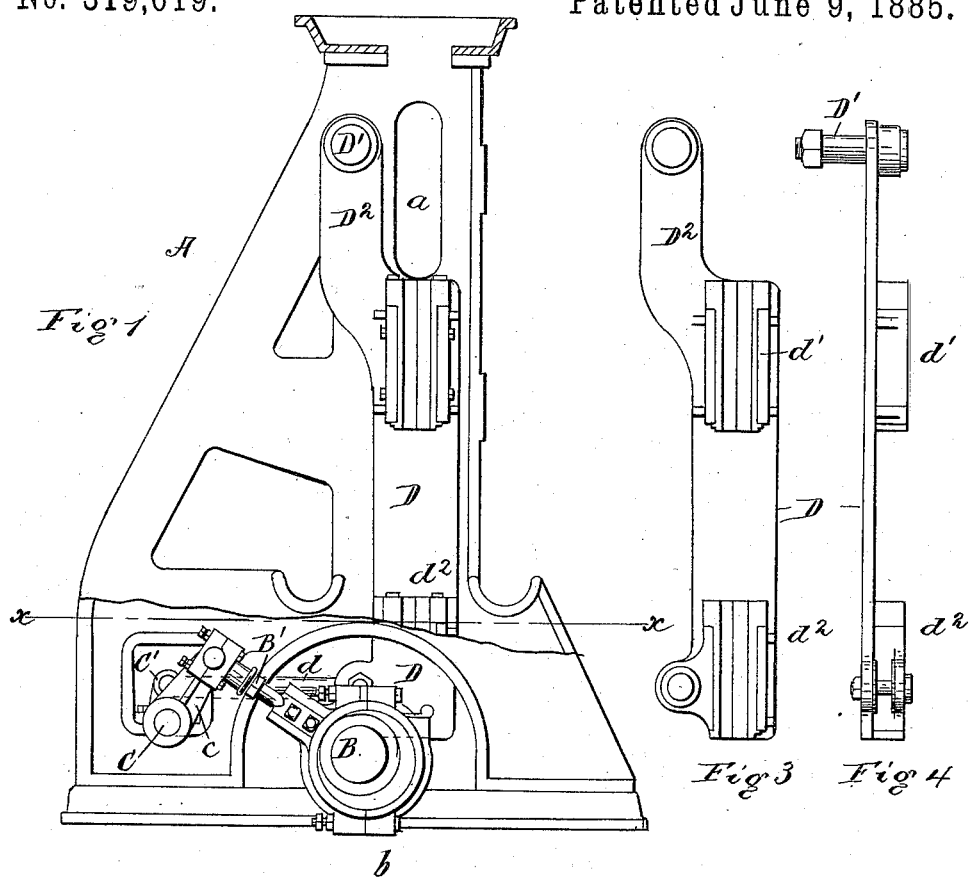
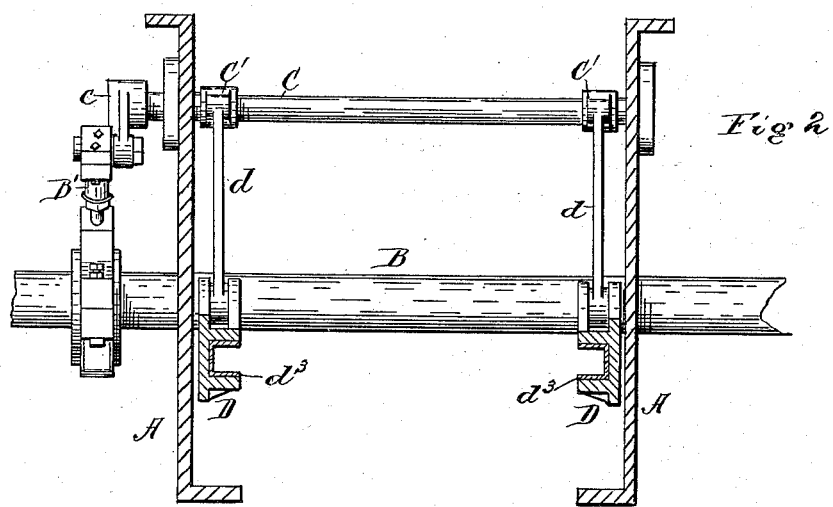
Witnesses
W. C. Collies
Irvine Miller
Inventor
De Witt C. Prescott
By Coburn & Thacher
Attorneys

UNITED STATES PATENT OFFICE.

DE WITT C. PRESCOTT, OF MARINETTE, WISCONSIN.

RECIPROCATING SAW-MILL.

SPECIFICATION forming part of Letters Patent No. 319,619, dated June 9, 1885.

Application filed October 15, 1884. (No model.)

*To all whom it may concern:*

Be it known that I, DE WITT C. PRESCOTT, a citizen of the United States, and residing at Marinette, in the county of Marinette and State of Wisconsin, have invented a certain new and useful Improvement in Oscillating Mechanism for Saw-Mills, which is fully set forth in the following specification, reference being had to the accompanying drawings, in which—

Figure 1 is a side elevation of a gang saw-mill frame having my improved oscillating guides attached thereto, one side of the frame being broken away to show the construction; Fig. 2, a sectional view on the line $x\ x$ of Fig. 1; and Figs. 3 and 4 are a face and edge view, respectively, of one of the guides detached.

My invention relates to gang saw-mills, and more especially to oscillating guides for the saw-gates, and is in the nature of an improvement on the mechanism set forth in Patent No. 296,618, granted to me April 8, 1884; and it consists in certain novel features, which I will now proceed to describe, and specifically point out in the claims.

In the drawings, A indicates the frame of the mill, and B the main shaft thereof, on which is mounted an eccentric, $b$, which operates, by means of connecting-rod B', the rock-shaft C, to the crank-arm $c$ of which the rod is attached. This rock-shaft is provided with arms C', connected by rods $d$ to the oscillating guides D. This mechanism for oscillating the guides is identical with that shown in my former patent hereinbefore referred to; but any other suitable mechanism may be used for the purpose. The guides are provided with upper and lower guide-boxes, $d'$ $d^2$, at their upper and lower ends, respectively, in which the saw-gate slides, the boxes being rectangular in form and provided with bronzed or vulcanized fiber linings $d^3$, as shown in Fig. 2. In the construction shown in my former patent these guides are pivoted at their upper extremities—that is to say, at the upper extremities of the guide-boxes, $d'$ and immediately below the opening $a$ in the frame A, through which the wrist-pin, connecting the saw-gate to the pitman which operates it, passes. I have found that with this location of the pivot the upper part of the saw had hardly any appreciable oscillation. In order to overcome this defect I have in the present instance pivoted the guides near the upper end of the opening $a$, and in the rear thereof, by means of pivot-bolts D', passing through frame A, and through upward and rearward extensions $D^2$ of the guides D. By this means the guides are pivoted at a point as high as the top of the stroke of the saw-gate and in the rear of their line of reciprocation, thereby producing a more even oscillation of the saws, and causing all parts of the gang to move in the same direction at the same time, greatly increasing the ease and smoothness of operation of the machine.

I do not wish to be understood as limiting myself to the precise details of construction shown and described, but reserve the right to employ such modifications as fairly come within the scope of my inventions.

Having thus described my invention, what I claim as new, and desire to secure by Letters Patent, is—

1. In a gang saw-mill, the combination, with the main frame, of the guide-plates having the guide-boxes $d'$ $d^2$ in line thereon and pivoted to the frame at a point in the rear of the line of said guide-boxes and at a height equal to the highest point of reciprocation of the saw-gate, and mechanism for oscillating said guide-plates, substantially as and for the purposes specified.

2. In a gang saw-mill, the combination, with the main frame, of the guide-plates D, having the rearward and upward extensions $D^2$, pivoted to the main frame at a point, D', in the rear of the line of said guide-boxes and at a height equal to the highest point of reciprocation of a saw-gate, and mechanism for oscillating the said guide-plates, substantially as and for the purposes set forth.

DE WITT C. PRESCOTT.

Witnesses:
W. C. CORLISS,
A. M. BEST.